United States Patent [19]

Krippl et al.

[11] Patent Number: 4,933,115
[45] Date of Patent: Jun. 12, 1990

[54] PROCESS FOR THE PRODUCTION OF A FLOWABLE MIXTURE WHICH REACTS TO FORM FOAM FROM FLOWABLE COMPONENTS STORED IN STORAGE CONTAINERS

[75] Inventors: Kurt Krippl, Monheim; Hans-Michael Sulzbach, Koenigswinter; Klaus Schulte, Leverkusen, all of Fed. Rep. of Germany

[73] Assignee: Bayer Aktiengesellschaft, Leverkusen, Fed. Rep. of Germany

[21] Appl. No.: 772,964

[22] Filed: Sep. 5, 1985

[30] Foreign Application Priority Data

Sep. 19, 1984 [DE] Fed. Rep. of Germany ....... 3434441
Nov. 24, 1984 [DE] Fed. Rep. of Germany ....... 3442954

[51] Int. Cl.$^5$ ............................................. B01F 3/04
[52] U.S. Cl. .................................. 261/18.1; 261/36.1; 261/87; 261/DIG. 26; 261/DIG. 27; 264/50; 422/133; 422/135; 422/225; 422/231; 521/917
[58] Field of Search ................... 261/18 R, 87, 93, 29, 261/36 R, DIG. 26, DIG. 27, 18.1, 36.1; 422/133, 135, 225, 226, 230, 231, 132; 73/19; 521/917; 425/4 R, 4 C; 264/50, 51

[56] References Cited

U.S. PATENT DOCUMENTS

| | | | |
|---|---|---|---|
| 363,173 | 5/1887 | Schenck | 261/87 X |
| 1,242,445 | 10/1917 | Ittner | 261/87 |
| 1,345,596 | 7/1920 | Hovland | 261/87 X |
| 2,138,349 | 11/1938 | Mallory | 261/93 X |
| 2,826,401 | 3/1958 | Peters | 261/87 |
| 2,880,076 | 3/1959 | Kircher, Jr. et al. | 422/132 |
| 3,846,515 | 11/1974 | Williamson | 261/DIG. 26 |
| 4,089,206 | 5/1978 | Raffel et al. | 73/19 |
| 4,157,427 | 6/1979 | Ferber | 521/133 |
| 4,312,820 | 1/1982 | Arnold et al. | 264/40.1 |
| 4,316,875 | 2/1982 | Barth et al. | 261/DIG. 26 |
| 4,376,172 | 3/1983 | Belangee et al. | 521/133 |

FOREIGN PATENT DOCUMENTS

| | | | |
|---|---|---|---|
| 3244037 | 5/1984 | Fed. Rep. of Germany. | |
| 1365184 | 8/1974 | United Kingdom | 261/87 |
| 1417377 | 12/1975 | United Kingdom. | |
| 1589306 | 5/1981 | United Kingdom | 261/DIG. 26 |

OTHER PUBLICATIONS

Patent Abstracts of Japan, JP A-58-108 116, Toyota Jidosha Kogyo, Jun. 28, 1983.

*Primary Examiner*—Richard L. Chiesa
*Attorney, Agent, or Firm*—Joseph C. Gil; Aron Preis

[57] ABSTRACT

The present invention relates to an improved process for the production of a flowable mixture which reacts to form foam from flowable components stored in storage containers, wherein prior to metered introduction into a mixing zone, at least one of the components is charged with a defined quantity of gas, by (i) introducing said one component and gas separately into a gasification chamber equipped with a hollow stirrer, (ii) sucking gas into said component through the hollow shaft of the hollow stirrer, and (iii) stirring the gas into the component, until the desired value is attained, the improvement wherein (a) the component is circulated from the storage container through the gasification chamber and back into the storage container, (b) the gas sucked through the hollow shaft of the hollow stirrer being maintained at a pressure at least equal to the pressure prevailing in the storage container, and (c) the component fraction remaining in the storage container is homogenized during those periods in which gasification does not take place.

3 Claims, 2 Drawing Sheets

PROCESS FOR THE PRODUCTION OF A FLOWABLE MIXTURE WHICH REACTS TO FORM FOAM FROM FLOWABLE COMPONENTS STORED IN STORAGE CONTAINERS

BACKGROUND OF THE INVENTION

The invention relates to a process and an apparatus for the production of a flowable mixture which reacts to form foam from flowable components stored in storage containers. Prior to the metered introduction into a mixing zone at least one of the components is charged with a defined amount of gas by introducing this component and gas separately into a gasification chamber equipped with a hollow stirrer. If gas is required, the gas is sucked in by the hollow stirrer through the hollow shaft thereof, is stirred into the component and is finely divided therein until the desired value is achieved.

With an apparatus of this general type (U.S. application Ser. No. 550,428, filed on Nov. 10, 1983, now abandoned; German Offenlegungsschrift No. 32 44 037), gasification is carried out in the storage container or in a smaller intermediate container. The air is sucked in by the hollow shaft inside the container directly from the gas space. The suction opening of the hollow shaft is thus located beneath the lid inside the gas space. The density measuring device switches on the stirrer mechanism by means of a control device in order to stir in gas when the lower tolerance threshold of the desired density value is exceeded, and switches it off again when the upper tolerance threshold is reached. This arrangement has the disadvantage that the stirrer mechanism can no longer be used for homogenizing the component located in the container because it is and must be switched off from time to time.

Segregation then occurs in the case of components containing additives which tend to settle. Continuous circulation is also important for keeping the temperature uniform.

The object of the present invention was to improve the apparatus in such a way that components containing additives which tend to settle and components which have to be kept at a uniform temperature can be circulated continuously for the purpose of homogenization.

DESCRIPTION OF THE INVENTION

Figure 1:
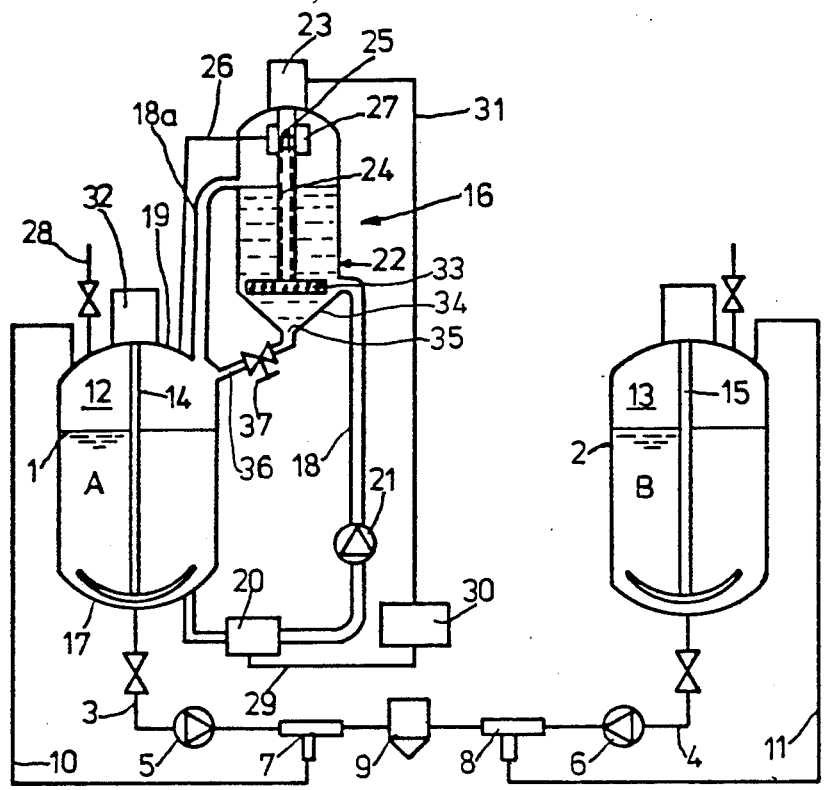
FIG. 1 shows an apparatus with supply of gas for gasification from the gas space of the storage container.

The above object is achieved according to the invention in that the component is circulated from the storage container through the gasification chamber and back into the storage container. The gas sucked in by the hollow stirrer is maintained at a pressure at least equal to the prevailing pressure in the storage container. The component fraction remaining in the storage chamber is also homogenized during those periods in which gasification does not take place.

In this manner, the gasification and homogenization processes have been separated. This means that the component can be circulated continuously in the storage container, for example by means of a stirrer mechanism, in order to avoid sedimentation and to keep the contents of the container at a uniform temperature even if, from time to time, gasification does not take place.

According to a particular embodiment of the new process, the gas is drawn by suction from the gas space of the storage container.

Storage containers for such components are generally kept under a preliminary pressure, generally of the order of from 2 to 5 bar. For this purpose, compressed air from a compressed air supply is supplied via a pressure regulating valve so that the pressure is kept constant in the container. It is particularly advantageous to remove the gas from the gas space because volatile substances contained in the component can escape from the component and accumulate in the gas space. They are then simultaneously reintroduced into the component during the gasification process.

According to one particular embodiment, the gas is taken from an external gas source and the pressure level in the gasification chamber is made to equal the pressure level of the gas supplied. Using this method, it is possible to carry out gasification either at the same pressure as that prevailing in the storage container or at a higher pressure level. The gasification process can be carried out correspondingly faster under a higher pressure level, i.e. more gas is absorbed by the component per unit time.

The new apparatus for producing the flowable mixture compression storage containers containing a gas space, wherein supply lines lead from the storage containers via metering pumps to a mixer head, with the supply system of at least one component being provided with a gasification container having a hollow stirrer as well as a gas content measuring device which is connected to the stirrer drive by means of a pulse switching device and the hollow stirrer has a suction opening. This apparatus has the disadvantage that the stirrer, due to its design, can operate only during the gasification periods.

The novelty lies in the fact that the stirrer container is arranged in a circulating line which leaves the storage container and reenters it, in which circulating line a conveying pump is provided and in that the suction opening of the hollow stirrer is provided with a gas supply line. This design of the apparatus enables the stirrer mechanism in the storage container to be operated independently of the gasification process.

According to one particular embodiment, the gas supply line is connected to the gas space of the storage container. In this way, the gas can be sucked from the gas space of the storage container just as advantageously as with the apparatus described in the above-identified U.S. application.

According to an alternative embodiment, the gas supply line is connected to an external gas source.

Two different operating methods are possible with this arrangement: Firstly, the pressure of the external gas source can be adjusted to the preliminary pressure in the storage container and, in the second case, a pressure higher than that in the storage container can prevail.

The gas supply line is preferably provided with a pressure regulator having a connection to the section of the circulating line leading into the storage container.

Pressure variations in the system can be compensated using this pressure regulator.

According to a further particular embodiment, the gas supply line and the section of the circulating line arranged between the gasification chamber and the storage container are joined to each other via a pressure balancing piston. This arrangement has the advantage that the pressure in the gasification chamber is automatically adapted to the pressure of the gas supplied from an external gas source. The pressure in the gasification chamber can be kept above the pressure level in the storage container so that gasification takes place more rapidly.

One embodiment has proven particularly advantageous, according to which the circulating line enters the gasification chamber at the level of the stirring elements of the hollow stirrer. By means of this arrangement, the air introduced is immediately mixed with the newly supplied component which means that the air is dispersed particularly quickly and intensively.

A further particular embodiment has proven advantageous, in particular for gasifying filler-containing components, according to which embodiment a rinsing line leads back to the storage container from the base of the gasification chamber, the base which is preferably conical in shape, being located above the maximum filling level of the storage container.

Since fillers, such as glass fibers, often tend to settle, the above method prevents deposits in the stirrer container. The rinsing line is optionally provided with a stop-valve which is, however, preferably always open when processing filler-containing components. This rinsing line either enters the storage container directly or indirectly by joining the section of the circulating line leading to the storage container. This rinsing line does, of course, only have a small cross-section so that the considerably larger portion of the gasified component leaves the gasification chamber via the returning section of the circulating line. The conical base ensures that settling particles move more quickly towards the outlet of the rinsing line.

The novel apparatus is illustrated purely diagrammatically in the drawing with reference to two embodiments and is described in more detail below.

In FIG. 1, components A and B pass from storage containers 1, 2 via supply lines 3, 4, metering pumps 5, and change-over valves 7, 8 to a mixing head 9. In order to circulate the components, circulating lines 10, 11, which lead back to the storage containers 1, 2, branch off from the change-over valves 7, 8. Gas spaces 12, 13 and stirrer mechanisms 14, 15 are arranged in the storage containers 1, 2. The storage container 1 is provided with a gasification device 16. It consists of several elements: A circulating line 18 leads from the base 17 of the storage container 1 and reenters the storage container 1 at the top 19. A gas content measuring device 20 (density measuring device according to document number 6100 belonging to the company Josef Heinrichs Messgeräte, D-5000 Cologne 41), a conveying pump 21 as well as a small stirrer mechanism container (or gasification chamber) 22 are arranged in succession in this circulating line 18. The stirrer mechanism of the stirrer mechanism container 22 consists of a drive 23 and a hollow stirrer 24 equipped with a stirring element 33, the suction opening 25 of said hollow stirrer 24 communicating with the gas space 12 of the storage container 1 via a gas supply line 26. The gas supply line 26 enters an annular chamber housing 27 which surrounds the hollow stirrer 24 at the level of the suction opening 25 in a sealing manner. The circulating line 18 enters the stirrer container 22 laterally at the level of the stirring element 33. A connection 28 which can be shut off and which is connected to a compressed gas source which is not shown is also provided on the storage container 1. A section 18a of the circulating line 18 extends between the stirrer mechanism container 22 and the storage container 1. The gas content measuring device 20 is connected via a pulse line 29 to a desired value comparator 30 which is designed as a pulse switching device and switches the drive 23 of the hollow stirrer 24 on and off as required via a pulse line 31. The drive 32 for the stirrer 14 of the storage container 1 can be driven independently thereof. The stirrer mechanism container 22 has a conical base 34 which tapers into an outlet 35, from which a rinsing line 36 with a shut-off valve 37 leads back into the supply container 1 and enters it above the maximum filling level. It has a considerably smaller cross-section than section 18a.

Figure 2:
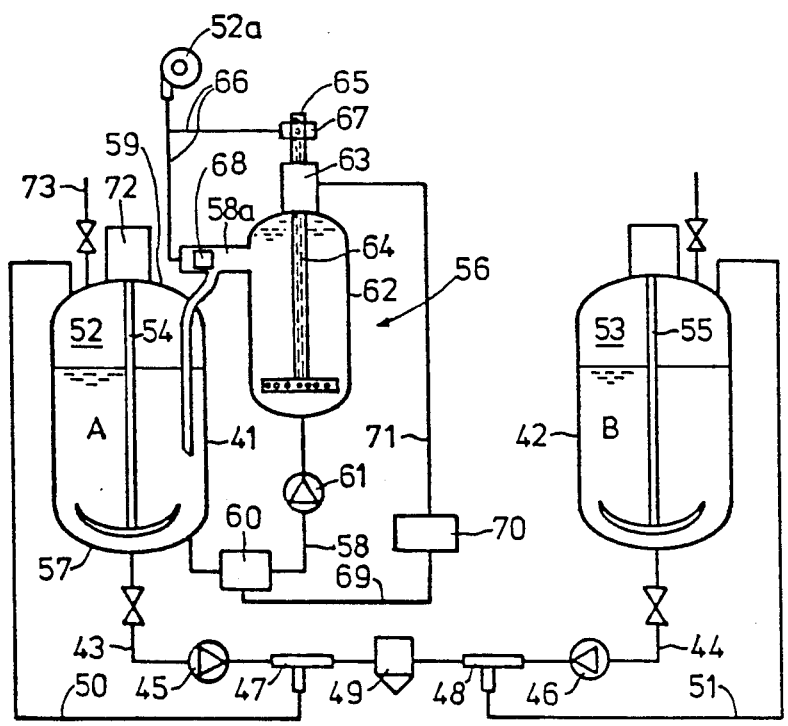
FIG. 2 shows an apparatus with an external gas source.

In FIG. 2, components A and B pass from storage containers 41, 42 via supply lines 43, 44, metering pumps 45, 46 and change-over valves 47, 48 into a mixing head 49. In order to circulate the components, circulating lines 50, 51, which lead back to the storage containers 41, 42, branch off from the change-over valves 47, 48. Gas spaces 52, 53 and stirrer mechanisms 54, 55 are arranged in the storage containers 41, 42. A gasification device 56 is connected to the storage container 41. It consists of several elements: A circulating line 58 leads from the base 57 of the storage container 41, reenters the storage container 41 at the top 59 and passes into the lower region thereof. A gas content measuring device 60, a conveying pump 61 as well as a small stirrer mechanism container (a gasification chamber) 62 are arranged in succession in this circulating line 58. The stirrer mechanism of the stirrer mechanism container 62 consists of a drive 63 and a hollow stirrer 64 whose suction opening 65 is connected, via a gas supply line 66, to an external gas source 52a (compressed air supply). A pressure reducing valve or pressure maintaining valve which are not shown may also be provided in some cases. The gas supply line 66 enters an annular chamber housing 67 surrounding the hollow stirrer 64 in a sealing manner at the level of the suction opening 65. A pressure-balancing piston 68 is arranged between the section 58a of the circulating line 58 extending from the stirrer mechanism container 62 and the storage container 41 and the gas supply line 66. The gas content measuring device 60 is connected via a pulse line 69 to a desired value comparator 70 designed as a pulse switching device which switches the drive 63 of the hollow stirrer 64 on and off as required via a pulse line 71. The drive 72 of the stirrer 54 of the storage container 41 can be driven independently thereof. The storage container 41 is connected via a supply line 73, which can be shut off, to a compressed air supply, which is not shown.

Figure 3:
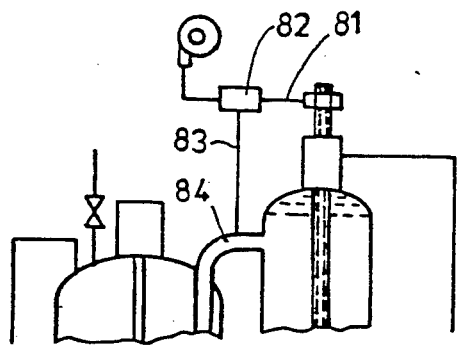
FIG. 3 shows a section of a modification to the apparatus according to FIG. 2.

The apparatus according to FIG. 3 differs from the apparatus according to FIG. 2 in that the balancing piston 68 is eliminated. Instead, there is arranged in the gas supply line 81 a pressure regulator 82 which detects the pressure prevailing in the line section 84 via a connection 83 and accordingly adjusts the pressure of the air to be supplied to it. In other respects, this embodiment corresponds to the embodiment shown in FIG. 2.

The invention is further illustrated, but is not intended to be limited by the following examples in which all parts and percentages are by weight unless otherwise specified.

EXAMPLES

Process Example 1

The apparatus according to FIG. 1 is used. A preliminary pressure of 4 bar is maintained in the storage container 1. In order to prevent the additives contained in component A from settling, the stirrer 14 is driven continuously by the stirrer mechanism 32. The density of the component is used as a gauge of the gas charge. The component is circulated continuously via the circulating line 18 by the conveying pump 21. In a specific ratio, the greater part flows via the line section 18a back into the storage container 1 and the smaller part via the rinsing line 36, in order to avoid deposits at the base 34 of the stirrer mechanism container 16. The density measuring device 20 continuously measures the density of component A under the set pressure of 4 bar and transmits the measured value via pulse line 29 to the desired value comparator 30. If the measured density value exceeds the specified desired value of 0.93 g/cm$^3$, the desired value comparator sets the stirrer mechanism drive 23 into operation via the pulse line 31 so that the hollow stirrer 24 produces a vacuum and sucks gas from the gas space 12 of the storage container 1 via the suction opening 25, the annular chamber housing 27 and the gas supply line 26. During gasification, the density of the component falls again and, when the desired value is reached, the desired value comparator 30 emits a pulse to switch off the stirrer mechanism drive 23. It goes without saying that the desired value has a certain tolerance spectrum and transmits the pulses to the stirrer mechanism drive 23 when the upper or lower threshold value is reached. Apart from prolonged rest periods, the metering pumps 5, 6 operate continuously and meter the components A and B via the change-over valves 7 and 8 into the mixer head 9 or convey them via the return lines 10 and 11 back into the containers 1 and 2.

Process Example 2

The apparatus according to FIG. 2 is used. The components A and B stored in the storage containers 41 and 42 under a pressure of 4 bar are circulated continuously by the stirrers 54 and 55. The conveying pump 61 arranged in the circulating line 58 circulates component A continuously. The density of component A is measured continuously by means of the density measuring device 60. The measured value is supplied to the desired value comparator 70 via a pulse line 69. A desired density value of 0.93 g/cm$^3$ is specified. If a rise in density occurs, the stirrer drive 63 is actuated via the pulse line 71 when the upper tolerance threshold of the desired value is attained. Compressed air is conveyed from the external gas source 52a via the gas supply line 66 to the suction opening 65 of the hollow stirrer 64 which sucks in this air and finely divides it in the component. The compressed air is subjected to a pressure of 5 bar. The pressure-balancing piston 68 ensures that the pressure is equalized between the compressed air supplied and the component issuing from the stirrer mechanism container 62 so that a pressure of 5 bar also prevails in the stirrer mechanism container 62. Gasification takes place in a substantially shorter period than in Process Example 1 owing to the higher pressure level in the stirrer mechanism container 62. Components A and B are conveyed via the supply lines 43 and 44 from the metering pumps 45 and 46 via the change-over valves 47, 48 into the mixer head 49 or they pass via the return lines 50 and 51 back into the storage containers 41 and 42 if the change-over valves 47 or 48 are in the appropriate position.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of a flowable mixture which reacts to form foam from flowable components stored in storage containers, wherein prior to metered introduction into a mixing zone, at least one of the components is charged with a defined quantity of gas, by (i) introducing said one component and gas separately into a gasification chamber equipped with a hollow stirrer, (ii) sucking gas into said component through the hollow shaft of the hollow stirrer, and (iii) stirring the gas into the component until the desired value is attained, the improvement wherein (a) the component is circulated from the storage container through the gasification chamber and back into the storage container, (b) the gas sucked through the hollow shaft of the hollow stirrer is maintained at a pressure at least equal to the pressure prevailing in the storage container, and (c) the component fraction remaining in the storage container is homogenized during those periods in which gasification does not take place.

2. The process of claim 1, characterized in that the gas is sucked from the gas space of the storage container.

3. The process of claim 1, characterized in that the gas is taken from an external gas source and the pressure level in the gasification chamber is made to equal the pressure level of the gas supplied.

* * * * *